May 30, 1944.  E. L. RIETZ  2,349,884
DRAFT DEVICE
Filed Feb. 23, 1942
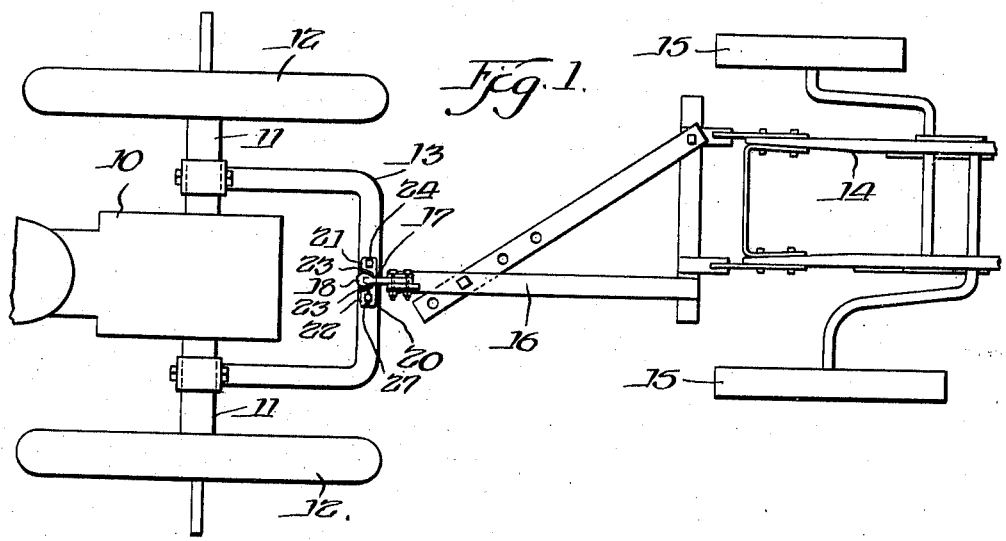
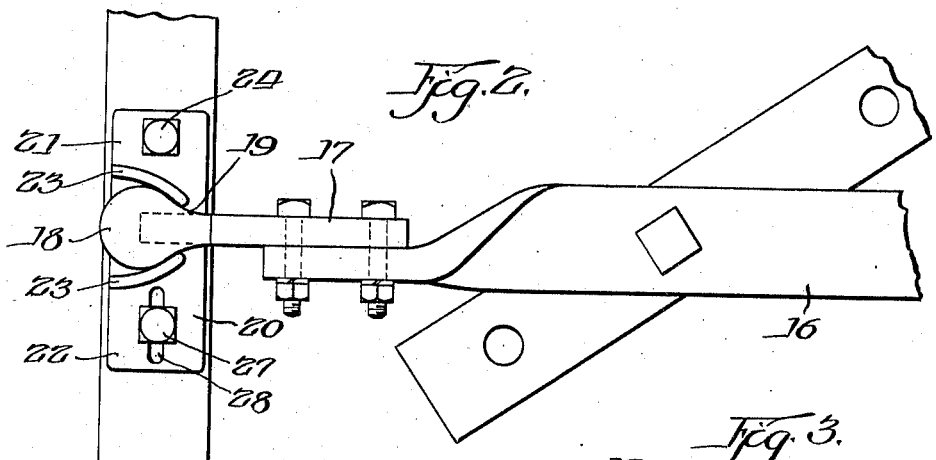
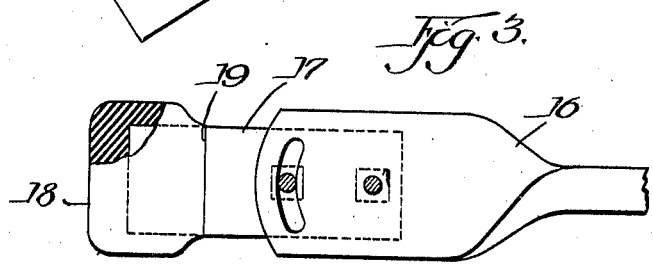
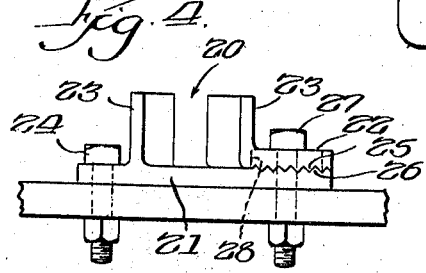
Inventor:
Edward L. Rietz.
By Paul O. Pippel
Atty.

Patented May 30, 1944

2,349,884

UNITED STATES PATENT OFFICE 2,349,884

DRAFT DEVICE

Edward L. Rietz, Riverside, Ill., assignor to International Harvester Company, a corporation of New Jersey Application February 23, 1942, Serial No. 431,954

7 Claims. (Cl. 280—33.15)

This invention relates to a draft device and particularly to such device as adapted for use as a connection between a draft vehicle and a trailing vehicle.

In its broader aspects the invention includes means applicable for use as a connecting device between a vehicle and an attachment for the vehicle, as, for example, where the attachment is to be mounted on or connected to a vehicle for movement with respect to the vehicle. A particular instance of this type occurs in the agricultural field where various types of vehicles are provided with attachments such as directly-mounted or trail-behind implements.

Referring now to the vehicle-attached-implement field as illustrative of a particular use of the invention, a vehicle, such as a tractor, has connected thereto or mounted thereon an agricultural implement. The latter may assume the form of a tillage tool such as a plow or cultivator. In the operation of such agricultural unit, circumstances arise in which it is desirable to have a releasable connection between the tractor and the implement so that the implement and tractor may have relative movement, or in some cases even become separated, along the line of draft upon the occurrence of excessive draft forces between the vehicle and implement or upon the application of other forces tending to resist the continued simultaneous movement of the tractor and implement. Various forms of devices have heretofore been worked out to accomplish the desired releasability or yieldability in a coupling of the type referred to. These devices, although satisfactory from the functional stand-point, are comparatively expensive, consisting as they do of complicated linkage and spring mechanism.

The present invention contemplates and has for its principal object the provision of an improved draft device consisting of mechanism highly simplified over prior devices.

An important object of the invention is to provide a draft device including hitch parts connected together by means consisting wholly or in part of yieldable or distortable material capable of absorbing shocks between the implement and vehicle or draft vehicle and trailing vehicle, and yieldable in response to excess draft forces to permit at least some degree of relative movement between the two connected parts.

Another important object is to provide such hitch connection in which the two parts are completely separable in response to an extreme force resisting continued forward (or, in some instances, rearward) movement of the trailing implement or vehicle.

Another object is to provide one of the hitch parts with an enlarged head portion consisting of resilient material, preferably rubber, and the other hitch part with a socket portion adapted to engage or embrace the rubber head portion.

Still another object is to provide the socket portion with a plurality of parts adjustable to vary the size of the socket so that the opening therein may be enlarged or restricted, thus providing means by which the relative movement or separation between the parts can be controlled as to the application of force necessary to bring about the desired relative movement of the separation.

A further understanding of the foregoing and other objects of the invention may be had from the following detailed description and accompanying sheet of drawings illustrating a preferred embodiment of the invention.

In the drawing:

Figure 1 is a plan view illustrating generally the adaptability of a preferred form of the invention to an agricultural tractor and attached implement;

Figure 2 is an enlarged plan view of a portion of the structure shown in Figure 1 illustrating on a larger scale the parts comprising the draft device;

Figure 3 is a side elevational view of the structure shown in Figure 2; and

Figure 4 is a front view of one of the hitch parts, as shown in Figure 2.

The following description and the accompanying drawing refer to the use of the invention in conjunction with the operation of an agricultural tractor and attached implement. It will be appreciated however, as the disclosure progresses, that the invention and modifications thereof are suitably adapted for many other uses and purposes, and the explanation of the preferred form of the invention is not intended to restrict the scope of the invention.

Figure 1 illustrates the rear portion of an agricultural tractor of usual design comprising a main body 10, transverse rear axle housings 11, and rear traction wheels 12. A draw-bar 13 of conventional type is rigidly connected to the rear axle housings 11. The agricultural implement shown is a plow consisting generally of a main frame 14 carried on wheels 15 and provided with a forwardly extending draft tongue 16. The forward end of the tongue 16, as best shown in Figures 2 and 3, is provided with a hitch part or element 17. This part is preferably formed of metal and extends forwardly toward the tractor draw-bar 13, having at that point an enlarged head or ball-like portion 18. This portion is formed of resilient or distortable material such as rubber or the like and is rigidly secured by bonding or other suitable method to the hitch part 17. The head is reduced and tapers toward the part 17 and provides a comparatively narrow neck portion 19.

An intermediate portion of the draw-bar 13 is provided with a second hitch part or element generally indicated at 20. This element preferably consists of a pair of members 21 and 22, each having upstanding flange portions 23. The flanges are curved and taper generally from the front toward the rear of the draw-bar in converging fashion, the members 21 and 22 being spaced apart so that the rear edges of the flanges 23 provide an opening slightly wider than the neck portion 19 of the resilient head 18 of the hitch part 17. The flanges 23 in effect form a socket or notch into which the head 18 fits, the opening provided by the spaced apart relation of the rearward edges of the flanges 23 restricting immediate separation between the tractor and implement along a line generally coincident with the line of draft. As best shown in Figures 2 and 4, the member 21 is rigidly secured to the draw-bar 13 by a bolt 24. The member 22 is adjustably secured to the draw-bar 13 through the medium of a serrated under-portion 25 which cooperates with a serrated portion 26 on an extension of the member 21, a second bolt 27 completing the assembly. The member 22 has a slot 28 to permit lateral adjustment thereof with respect to the member 21 and bolt 27. The adjustability between the flanges 23 provides means for regulating the size of the opening between the rearward edges of the flanges, thus enabling the operator to control or vary the periods at which the tractor can pull away from the implement.

In the operation of the tractor and implement, as equipped with the preferred form of the invention just described, the hitch part 20, comprising the adjustable parts 22 and 23, is secured to the draw-bar 13 with the flanges spaced apart at the desired distance. The tongue 16 with the hitch part 17 thereon is connected to the draw-bar 13 by means of the interfitting of the head portion 18 with the socket provided by the flanges 23. During operation of the tractor and implement, an obstruction may be encountered by the implement. However, as is usual on such occasions, the operator of the tractor may not be aware of the obstruction and will continue driving the tractor ahead, and in the absence of a releasable coupling the tractor and implement or some of the draft parts would very probably be damaged. However, if the connection is releasable, or at least yieldable, the probability of such damage is eliminated. According to the present invention, the enlarged head 18, being formed of resilient material is yieldable or distortable and consequently reducible in size and, upon the application of a force exceeding the predetermined draft force between the vehicle and implement, can completely pull out of or separate from the socket in the attaching part 20. In the event that the obstruction is comparatively minor, it is possible that it will be overcome by continued forward movement of the tractor and implement. However, the connection herein disclosed eliminates the possibility of damage even in that case, for the resilient material of the attaching part 17 can yield in response to greater draft forces, and even though the head 18 does not completely pull out of the hitching part 20, it is capable of yielding to a comparatively large degree.

As stated previously, the present disclosure is of only a preferred embodiment of the invention. It will be understood, of course, that the agricultural implement illustrated in Figure 1 may be replaced by any form of trailing implement such as a mower, harrow, farm wagon, or other similar vehicle and that the tractor may be similarly replaced by any other form of draft source. Likewise, the improved hitch connection may be utilized as a connecting means between a vehicle and parts or attachments which are mounted on or directly connected to the vehicle, the most usual instance of such vehicle attachments being the vehicle-mounted cultivators, mowers, and the like, well known to those skilled in the art. It will be further appreciated that other various alterations and modifications may be made in the detailed structure without departing from the spirit and scope of the invention as defined in the appended claims.

What is claimed is:

1. Releasable hitch means for connecting a draft vehicle and trailing vehicle together, comprising a first part adapted to be connected to one vehicle, and a second part adapted to be connected to the other vehicle, the first part including a portion formed with an adjustably fixed opening, the second part having a portion formed of yieldable material and including a neck portion and an enlarged head portion, said parts being normally connected together with the aforesaid neck portion fitting the opening in the second part and the enlarged head portion yieldably resisting separation of the parts, said enlarged head portion being yieldable upon excess of a predetermined draft force between the vehicles to escape the fixed opening in the second part for at least partial release of the trailing vehicle from the draft vehicle.

2. Releasable hitch means for connecting a draft vehicle and trailing vehicle together, comprising first and second connectable elements, means for connecting one element to one vehicle, and means for connecting the other element to the other vehicle, the first element being formed with an opening therein, means for releasably connecting said elements including a portion on the second element fitting the opening and an enlarged head portion formed of yieldable material normally engaging the first element at portions thereof around the opening, said enlarged portion yielding to an excess of a predetermined draft force between the vehicles to become reduced in size and to escape the opening for at least partial separation of said vehicles.

3. Releasable draft means for connecting an agricultural implement to a tractor, comprising a first hitch part adapted for connection to the tractor and having a socket portion open to the rear of the tractor, a second hitch part adapted for connection to the implement and including a ball-like portion formed of yieldable material and fitting the aforesaid socket portion, said ball-like portion being yieldable and reducible in size to pull out of the socket portion upon an excess of draft force between the tractor and the implement.

4. Releasable draft means for connecting a pair of vehicles for movement together, comprising a first hitch part adapted for connection to one vehicle and having a socket portion opening toward the other vehicle, a second hitch part adapted for connection to the other vehicle and including a ball-like portion formed of yieldable material and fitting the aforesaid socket portion, said ball-like portion being yieldable and reducible in size to pull out of the socket portion upon an excess of draft force between the tractor and the implement, said socket portion including a pair of adjustable parts for regulating the size of the opening therein, and means for securing said adjustable parts in any of a plurality of selected positions.

5. Releasable draft means for connecting a draft vehicle and a trailing vehicle, comprising a first hitch element adapted for connection to one vehicle, a second hitch element adapted for connection to the other vehicle, the first hitch element including a portion formed of yieldable material, means on the second hitch element including a pair of spaced apart members engageable with the portion on the first element and normally interfitting with said portion to secure the hitch elements together, said portion being yieldable for reduction in size to escape the pair of members for at least partial separation of the hitch elements upon an excess of draft force between the vehicles.

6. Releasable draft means for connecting a draft vehicle and a trailing vehicle, comprising a first hitch element adapted for connection to one vehicle, a second hitch element adapted for connection to the other vehicle, the first hitch element including a portion formed of yieldable material, means on the second hitch element including a pair of spaced apart members engageable with the portion on the first element and normally interfitting with said portion to secure the hitch elements together, said portion being yieldable for reduction in size to escape the pair of members for at least partial separation of the hitch elements upon an excess of draft force between the vehicles, and means disposing said members for adjustment of the spacing therebetween to vary the extent of engagement of said members with the yieldable portion of the second hitch element for controlling the occurrence of the separation between said elements.

7. Releasable connecting means for connecting a vehicle and an attachment therefor for movement together, comprising first and second hitch parts, means for connecting one hitch part to the vehicle, means for connecting the other hitch part to the attachment, one hitch part including a socket portion having an opening therein, and the other hitch part including an enlarged headed portion formed of yieldable material and engageable with the aforesaid socket portion through the opening therein, said headed portion being yieldable for reduction in the size thereof to escape through the aforesaid opening upon excess of a predetermined force resisting continued movement of the attachment with the vehicle.

EDWARD L. RIETZ.